UNITED STATES PATENT OFFICE 2,560,894

PROCESS FOR THE MANUFACTURE OF C-NITROSOARYLAMINES

Stiles M. Roberts, Easton, Pa., assignor to General Aniline & Film Corporation, New York, N. Y., a corporation of Delaware No Drawing. Application December 22, 1949, Serial No. 134,596

7 Claims. (Cl. 260—576)

This invention relates to the manufacture of C-nitrosoarylamines by nitrosation of the corresponding secondary arylamines and rearrangement of the N-nitroso compound. More particularly, it relates to a process of effecting the manufacture of the C-nitrosoarylamines by a one-step process directly from the corresponding secondary arylamine. This application is a continuation-in-part of my co-pending application Serial No. 666,532, filed May 1, 1946, now Patent No. 2,495,774.

The rearrangement of N-nitrosoarylamines to their corresponding carbon nitroso derivatives is a well-known process. It has been described as early as 1886 by O. Fischer in connection with the preparation of p-nitroso-N-methylaniline, p-nitroso-N-ethylaniline, p-nitroso-N-ethyl-o-toluidine, and 4-nitrosodiphenylamine in Berichte, volume 19, page 2994. With particular reference to the dairylamines, it has been found difficult to effect the rearrangement of the N-nitroso derivative to the C-nitroso compound. It has generally been necessary to first convert the diarylamine to its N-nitrosoamine derivative with nitrous acid, isolate this derivative and then isomerize it by treatment with anhydrous ethyl alcoholic hydrochloric acid. The N-nitroso derivative is generally dried after isolation before effecting the rearrangement.

The preparation of the C-nitrosodiarylamines, and particularly 4-nitrosodiphenylamine, from the corresponding secondary diarylamines in one operation without isolation of any intermediate N-nitroso compound is described in U. S. Patent 2,046,356 by Max Wyler et al. The Wyler process carries out the conversion under strictly anhydrous conditions. As a solvent for the diarylamine, there is employed an anhydrous alcohol, for example methyl alcohol, to which the dry hydrogen chloride is added in an absolute alcohol solution. The required alkali metal nitrite for the conversion is added in dry powdered form. When N-alkyl arylamines are used for this conversion, the same reaction can be accomplished, and was accomplished by O. Fischer, by merely adding a cold concentrated solution of a metal nitrite to an alcoholic hydrogen chloride suspension or solution of the base, but when using the diarylamines with the same reactants, Wyler applied strictly anhydrous conditions in order to accomplish the conversion in a single step.

I have now found that the inherently difficultly convertible diarylamines can be converted to the carbon nitroso derivatives in a single step in a much simpler manner and without the necessity of using difficultly obtainable reactants, such as dry hydrogen chloride, absolute alcohol and dry sodium nitrite, if silicon tetrachloride ($SiCl_4$) is substituted for the hydrogen chloride. In this process I may use commercial grades of alcohol such as the low molecular weight aliphatic alcohols which normally contain water in percentages of from 1–5. If desired, further amounts of water may be added and, of course, it is not necessary to use dry reaction vessels. There is no loss in yield and, as a matter of fact, improved yields of carbon nitrosodiarylamines of good quality are obtained. The process is carried out in its preferred manner by introducing the silicon tetrachloride into a suspension of the diarylamine and an alkali metal nitrite in a commerical grade of an alcohol, such as methanol, subsequently drowning the reaction mixture in an ice water mixture and finally isolating the carbon nitrosoarylamine by known methods most suitable to the specific amine employed. In some cases, the product may be filtered off as the hydrochloride following the drowning operation.

This process is not restricted to any particular secondary arylamines, but is of particular interest in the case of the diarylamines which are difficultly convertible in a one-step operation to the C-nitrosodiarylamines. The process may be applied to any secondary arylamine capable of undergoing the formation of N-nitroso derivatives and rearrangement to C-nitrosoarylamines. Typical examples of compounds which are capable of such rearrangement are: diphenylamine, phenyl-α-naphthylamine, di-1-naphthylamine, 3-acetylaminodiphenylamine, and 4-acetylaminodiphenylamine.

Although it is preferable to add the silicon tetrachloride to a suspension of the arylamine and alkali metal nitrite in an alcohol solution, it is possible to first react the silicon tetrachloride with the alcohol and add the arylamine to this mixture, after which the alkali metal nitrite may be incorporated. The amount of silicon tetrachloride required to effect the conversion may vary, but for best results from 1 to 8 mols should be employed per mol of the base. The temperature at which the agent necessary for the nitrosation and rearrangement is added is preferably from 0 to 30° C.

The following example, in which the parts given are by weight unless otherwise stated, will serve to further illustrate the invention, but is not intended to limit its scope.

Example 169 g. of diphenylamine, equal to one gram mol, is dissolved in 360 g. of methanol (commercial) by warming to 35–40° C. The solution is cooled to 0–5° C. and 80 g. of finely divided sodium nitrite is added. Over a period of 2–3 hours 197 g. of silicon tetrachloride is added at 0–5° C. The mixture is then stirred from 4–8 hours at 0–5° C., poured into 3000 cc. of ice water, stirred one hour, then filtered and washed with water or salt solution. The 4-nitrosodiphenylamine hydrochloride thus obtained can be transformed into the free base by dissolving it in alkali, filtering from any residue and precipitating the base with acetic acid. This product crystallized from a mixture of benzene and petrol ether has a melting point of 145–146° C.

Having now described my invention and the best manner in which to perform it, what I claim is:

1. The process of producing a C-nitroso diarylamine which comprises reacting an alkali metal nitrite in an aliphatic alcohol medium with an unsubstituted diarylamine in the presence of silicon tetrachloride at a temperature not exceeding 30° C. while utilizing said silicon tetrachloride to react with the water present to generate hydrogen chloride and maintain the reaction mixture in a substantially anhydrous condition.

2. The process of producing a C-nitroso diarylamine which comprises introducing into an aliphatic alcohol media containing an alkali metal nitrite and an unsubstituted diarylamine, silicon tetrachloride at a temperature not exceeding 30° C. while utilizing said silicon tetrachloride to react with the water present in the reaction mixture to produce hydrogen chloride and maintain the reaction mixture substantially anhydrous, drowning the reaction mixture in an ice water mixture and isolating the C-nitroso diarylamine.

3. The process of producing a C-nitroso diarylamine which comprises reacting at a temperature not exceeding 30° C. an unsubstituted diarylamine and an alkali metal nitrite in methanol in the presence of silicon tetrachloride while utilizing the silicon tetrachloride to react with the water present to produce hydrogen chloride and maintain the reaction mixture substantially anhydrous, drowning the reaction mixture in an ice water mixture and isolating the resulting C-nitroso diarylamine.

4. The process as defined in claim 1 wherein the aliphatic alcohol media is commercial methanol.

5. The process of producing a C-nitroso diarylamine which comprises introducing silicon tetrachloride at a temperature not exceeding 30° C. into a suspension of an unsubstituted diarylamine and an alkali metal nitrite in commercial methanol while utilizing the silicon tetrachloride to react with the water present to produce hydrogen chloride and maintain the reaction mixture substantially anhydrous, drowning the reaction mixture in an ice water mixture and isolating the resulting C-nitroso diarylamine.

6. The process as defined in claim 1 wherein the unsubstituted diarylamine is diphenylamine.

7. In the process of producing a C-nitroso diarylamine by reacting at a temperature not exceeding 30° C. an unsubstituted diarylamine with an alkali metal nitrite in an aliphatic alcohol in the presence of hydrogen chloride, the improvement which comprises generating the hydrogen chloride in the reaction mixture by the addition thereto of silicon tetrachloride which operates to maintain the reaction mixture in a substantially anhydrous condition.

STILES M. ROBERTS.

REFERENCES CITED

The following references are of record in the file of this patent:

UNITED STATES PATENTS

| Number | Name | Date |
| --- | --- | --- |
| 2,495,774 | Roberts | Jan. 31, 1950 |

OTHER REFERENCES

Parkes et al.: "Mellor's Modern Inorganic Chemistry," Longmans, Green & Co., New York, N. Y., new edition, 1939, p. 693.